(12) United States Patent
Wozniak et al.

(10) Patent No.: US 11,654,583 B2
(45) Date of Patent: May 23, 2023

(54) VALVE OPERATING DEVICE HAVING A MOVABLE ARM FOR USE IN EXERCISING VALVES

(71) Applicant: ILLINOIS TOOL WORKS INC., Glenview, IL (US)

(72) Inventors: Mark W. Wozniak, Cary, IL (US); Jeffrey M. Swiatowy, Crystal Lake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 539 days.

(21) Appl. No.: 16/743,652

(22) Filed: Jan. 15, 2020

(65) Prior Publication Data

US 2020/0230827 A1    Jul. 23, 2020

Related U.S. Application Data

(60) Provisional application No. 62/793,750, filed on Jan. 17, 2019.

(51) Int. Cl.
| | |
|---|---|
| *B25J 17/02* | (2006.01) |
| *B25J 5/00* | (2006.01) |
| *B25J 18/00* | (2006.01) |
| *F16K 31/50* | (2006.01) |
| *F16L 55/11* | (2006.01) |

(52) U.S. Cl.
CPC ........... *B25J 17/0291* (2013.01); *B25J 5/007* (2013.01); *B25J 18/007* (2013.01); *F16K 31/504* (2013.01); *F16L 55/1108* (2013.01)

(58) Field of Classification Search
CPC ...... B25J 17/0291; B25J 5/007; F16K 31/041; Y10T 137/6855
See application file for complete search history.

(56) References Cited

U.S. PATENT DOCUMENTS

| | | |
|---|---|---|
| 1,536,081 A | 1/1920 | Dean |
| 1,979,340 A | 11/1934 | Norman |
| 3,481,229 A | 12/1969 | Dickmann et al. |
| 3,847,039 A | 11/1974 | Azuma |

(Continued)

OTHER PUBLICATIONS

European Communication and Search Report for corresponding European Patent Application No. 20151481.7 dated Jul. 13, 2020, 7 pages.

(Continued)

*Primary Examiner* — Reinaldo Sanchez-Medina
(74) *Attorney, Agent, or Firm* — Klintworth & Rozenblat IP LLP (57) ABSTRACT

A valve operating device includes first and second pivots, a first arm portion extending therebetween, a second arm portion extending from the second pivot, a valve operating machine on the second arm portion, and an actuator connected between the first pivot and the first arm portion. The first arm portion can rotate around a first vertical axis defined by the first pivot and can pivot around a horizontal axis defined by the first pivot. The second arm portion can rotate around a second vertical axis defined by the second pivot. The actuator causes the first and second arm portions, the second pivot, and the valve operating machine to pivot upward and downward relative to the first pivot around the horizontal axis.

20 Claims, 8 Drawing Sheets

(56) References Cited

U.S. PATENT DOCUMENTS

| | | |
|---|---|---|
| 3,977,636 A | 8/1976 | Bumueller |
| 4,828,033 A | 5/1989 | Frison |
| 5,018,929 A | 5/1991 | Carson |
| 5,063,505 A | 11/1991 | Pate et al. |
| 5,101,862 A | 4/1992 | Leete |
| 5,339,239 A | 8/1994 | Manabe et al. |
| 5,361,996 A | 11/1994 | Svensson et al. |
| 5,381,996 A | 1/1995 | Arnemann et al. |
| 5,558,169 A | 9/1996 | Madgwick et al. |
| 5,570,581 A | 11/1996 | Preston |
| 5,570,975 A | 11/1996 | Reinert, Sr. |
| 5,662,176 A | 9/1997 | Madgwick |
| 5,810,051 A | 9/1998 | Campagna |
| 5,937,373 A | 8/1999 | Ferrar |
| 6,009,905 A | 1/2000 | Arnemann |
| 6,125,868 A | 10/2000 | Murphy et al. |
| 6,471,165 B2 | 10/2002 | Twisselmann |
| 6,715,550 B2 | 4/2004 | Venegar et al. |
| 6,945,336 B1 | 9/2005 | Darling et al. |
| 7,004,262 B1 | 2/2006 | Voichoskie |
| 7,111,817 B2 | 9/2006 | Teti et al. |
| 7,311,452 B2 | 12/2007 | Chapman |
| 7,334,606 B1 | 2/2008 | Hurley |
| 7,415,376 B1 | 8/2008 | Hurley |
| 7,604,023 B2 | 10/2009 | Buckner et al. |
| 7,784,490 B1 | 8/2010 | Stewart et al. |
| 8,025,078 B2 | 9/2011 | Ferrar |
| 8,387,664 B2 | 3/2013 | Ferrar |
| 8,851,121 B2 | 10/2014 | Ferrar et al. |
| 8,864,101 B1 | 10/2014 | Buckner |
| 9,038,667 B2 | 5/2015 | Ferrar |
| 9,188,240 B1 | 11/2015 | Ferrar |
| 9,523,443 B2 | 12/2016 | Ferrar |
| 9,719,630 B1 * | 8/2017 | Hurley ................ F16M 13/02 |
| 9,835,285 B1 * | 12/2017 | Hurley .............. F16M 11/2014 |
| 10,156,298 B2 | 12/2018 | Ferrar |
| 10,267,431 B2 * | 4/2019 | Preston .............. F16K 37/0041 |
| 10,995,872 B1 * | 5/2021 | Hurley .................. F16K 31/14 |
| 2004/0134674 A1 | 7/2004 | Skorez |
| 2005/0137752 A1 | 6/2005 | Alvarez |
| 2005/0193451 A1 | 9/2005 | Quistgaard |
| 2006/0011881 A1 | 1/2006 | Leighton |
| 2007/0007418 A1 | 1/2007 | Lubbers |
| 2007/0067911 A1 | 3/2007 | Graham et al. |
| 2007/0159161 A1 | 7/2007 | Neill |
| 2008/0196790 A1 | 8/2008 | Fargeot |
| 2009/0267010 A1 | 10/2009 | Ferrar |
| 2011/0012752 A1 | 1/2011 | Ferrar |
| 2012/0138830 A1 | 6/2012 | Ferrar et al. |

OTHER PUBLICATIONS

Vermeer Manufacturing Company; FM350 FlowMaster Series (product literature); 1210 Vermeer Road East; P.O. Box 200; Pella, IA; 50219, 2007, 2 pages.

advancedmanipulator.com; www.advancedmanipulator.com/images/torque_arm/horton.jpg; www.advancedmanipulator.com/inmages/torque_arm/gehl.jpg; www.advancedmanipulator.com/images/torque_arm/horton.jpg; publicly available at least as early as Apr. 11, 2008, 3 pgs.

* cited by examiner

VALVE OPERATING DEVICE HAVING A MOVABLE ARM FOR USE IN EXERCISING VALVES

CROSS REFERENCE TO RELATED APPLICATIONS

This application claims the domestic benefit of U.S. Provisional Application Ser. No. 62/793,750, filed on Jan. 17, 2019, the contents of which are incorporated herein in its entirety.

FIELD OF THE INVENTION

The present disclosure generally relates to exercising valves.

BACKGROUND

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. Also, the valves of the system typically remain in an open condition or in a closed condition for very long periods of time.

The valves of a municipal water system are located below ground with an access shaft extending from the valve stem to the surface through which an elongate key is extended to turn the stem. Such valves typically include a screw that is rotatable through one hundred turns or more to fully open or fully close the valve. Also, underground valves undergo a certain degree of deterioration over time and it is common for valves to become frozen or locked into their current position as a result of contamination on the surface of the screw or deterioration of the parts. As a result, the large amount of torque needed to open and close such valves is provided by a motorized valve turning machine. Such machines are heavy and awkward and when operated apply a great amount of torque to the key that extends down a shaft to the valve stem for rotating the valve. Accordingly, to aid in the operation of such valve turning machines, it is common to mount such valve turning machines on an arm attached to a vehicle such as, for example, a truck or trailer.

One such mounting device mounts a valve turning machine on a horizontal slide that allows the machine to move horizontally from a first position over the truck bed to a second position spaced from the side of the truck. Such slideable mounting provides rigid support to the valve turning machine while it exercises a valve. This longitudinally slideable structure, however, has limited mobility with respect to the vehicle. Where valves are positioned between various obstacles such as buildings, curbs, boulders, trees and the like, it may not be possible for the truck to reach a position where the valve turning machine may be positioned directly over the shaft leading to the valve. In addition, the ground may be uneven; such a longitudinally slidable structure does not provide for vertical movement of the mounting device to accommodate uneven ground.

Efforts have been made to attach a valve turning machine to a manipulating arm connected to a truck. Such a device includes a multi-hinged arm configured as a backhoe with the inner end of the arm connected to a vehicle and the outer end to a valve turning machine. The arm is pivotable about a horizontal axis generally giving the device a one hundred and eighty degree of rotation with the hinged elbow of the backhoe arm permitting the free end of the arm to move eight to twelve feet radially outward of the vehicle. The hinged elbow includes one or more spring loaded compensating structures to apply a vertically upward force to the free end of the arm to compensate for the weight of the valve turning machine. By virtue of the spring-loaded compensating devices, the free end of the arm can be manipulated to a position directly over an otherwise difficult to reach shaft to a valve.

It has been found that a valve turning machine mounted on this type of arm attached by a key to a valve and with torque applied to the key by the machine, the machine will shake and toss violently as the valve is exercised. The shaking and tossing are a result of the uneven torque applied to the key as the turning screw encounters areas of contamination by foreign materials and deterioration of the moving parts. The shaking and tossing of the machine include vertical components of force which cause the key to be pulled free of the valve stem, thereby interrupting the valve turning operation and perhaps causing damage to either the machine or the valve. To retain the machine and the key in their desired orientation with respect to the valve stem, the operator is required to grasp the machine with his/her arms and use his/her body weight to hold the machine in the desired orientation as the valve is exercised.

Since the shaking and tossing of the machine is caused by contamination and deterioration below ground and not visible to the operator, the movement of the machine is unpredictable and can also cause injury to the operator. Accordingly, there is a need for providing an extendible arm for supporting a valve turning machine over a valve stem positioned remotely from a vehicle that will retain the machine against all the forces applied to the end of the arm as a consequence of frequent and sudden changes in torque applied to the valve.

SUMMARY

The present disclosure is defined by the following claims, and nothing in this section should be taken as a limitation on those claims.

In one aspect, a movable arm for use in exercising valves is provided.

In one aspect, a valve operating device having a movable arm for use in exercising valves is provided.

In another aspect, a valve operating device having a movable arm for use in exercising valves is provided and which is mounted on a vehicle.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
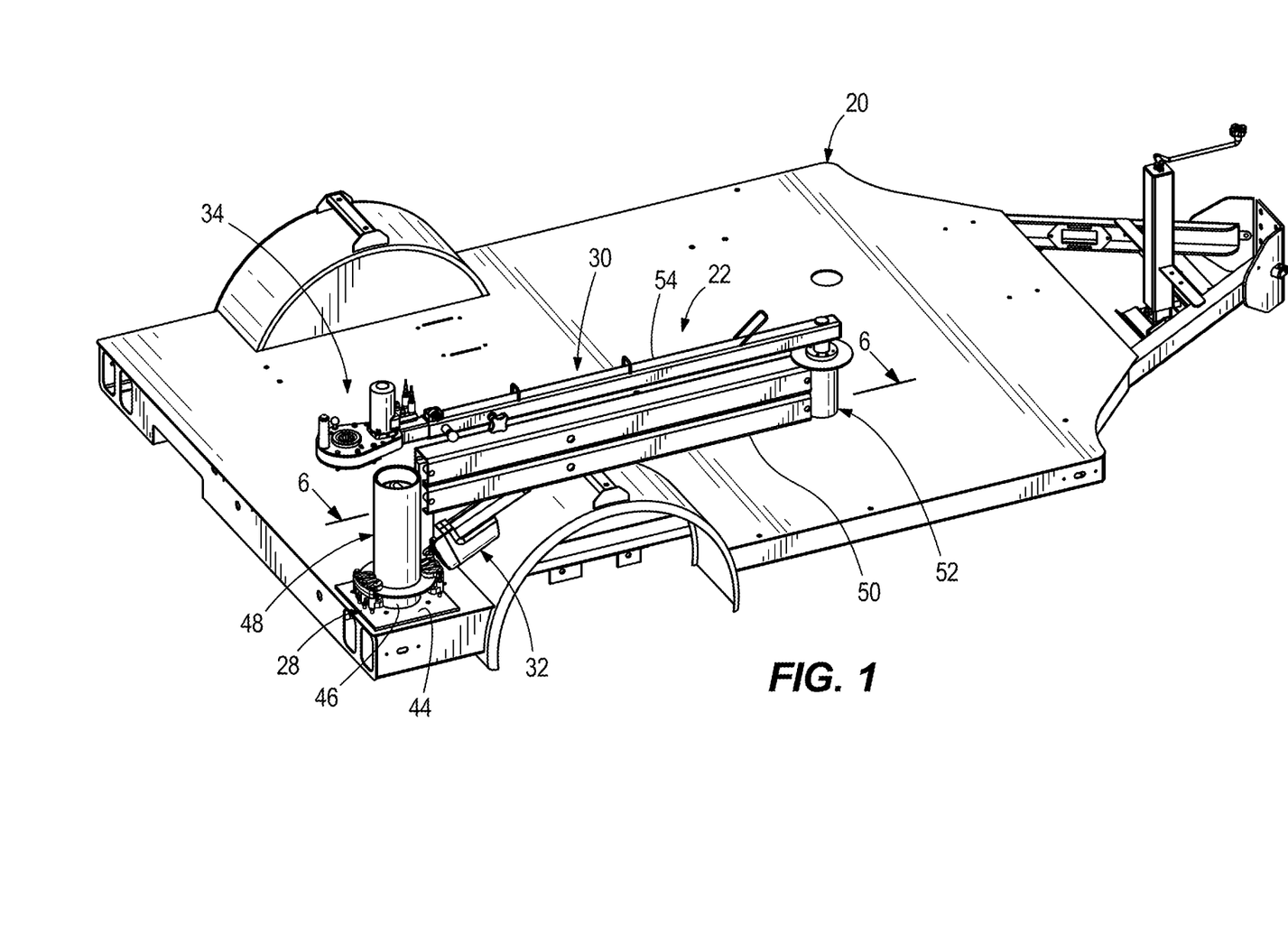
FIG. 1 is a perspective view of a valve operating device having a movable arm for use in exercising valves shown mounted on a bed of a vehicle in accordance with the present disclosure.
Figure 2:
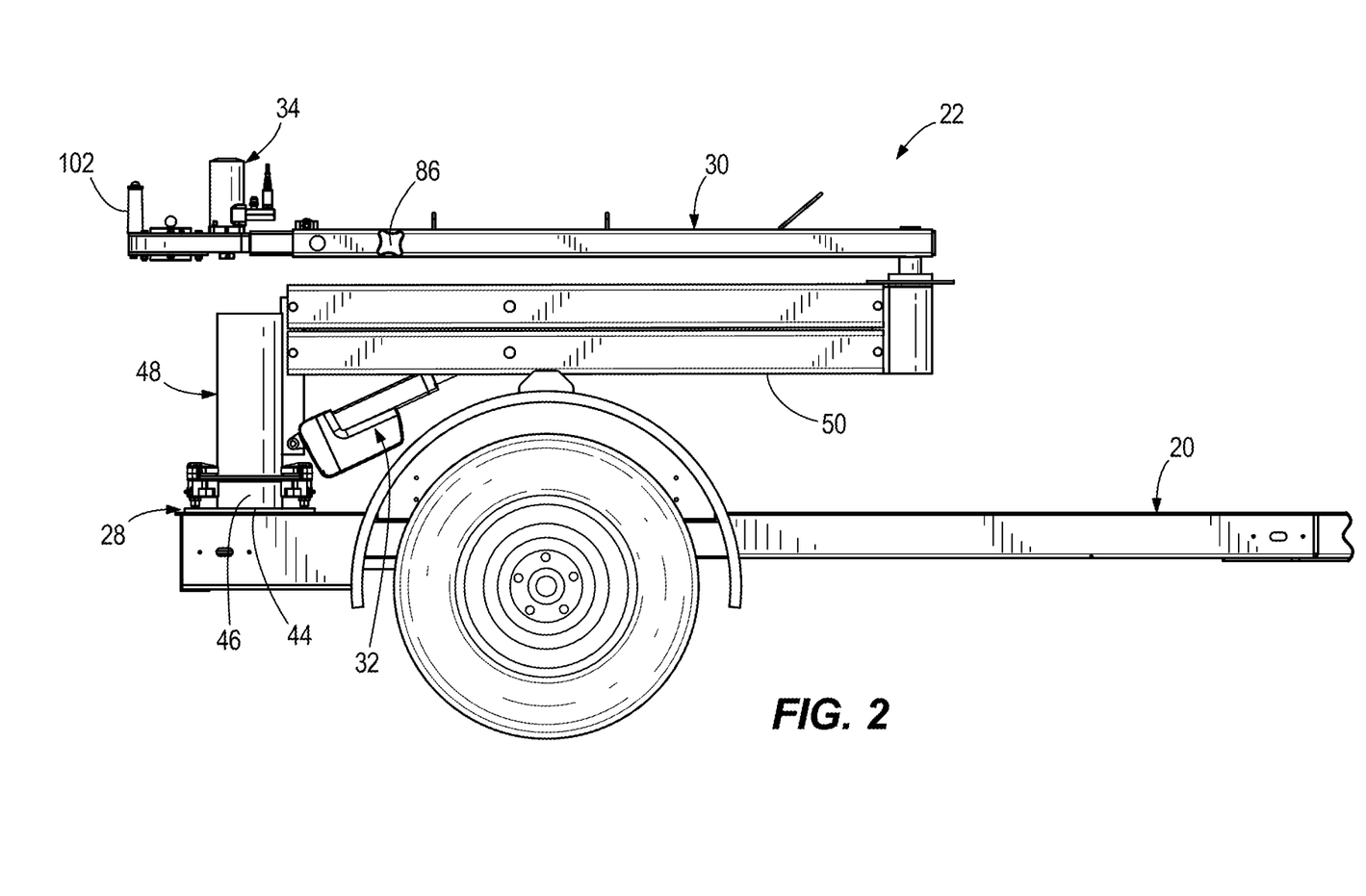
FIG. 2 is a side elevational view of the valve operating device in a storage orientation and shown mounted on a bed of a vehicle in accordance with the present disclosure.
Figure 3:
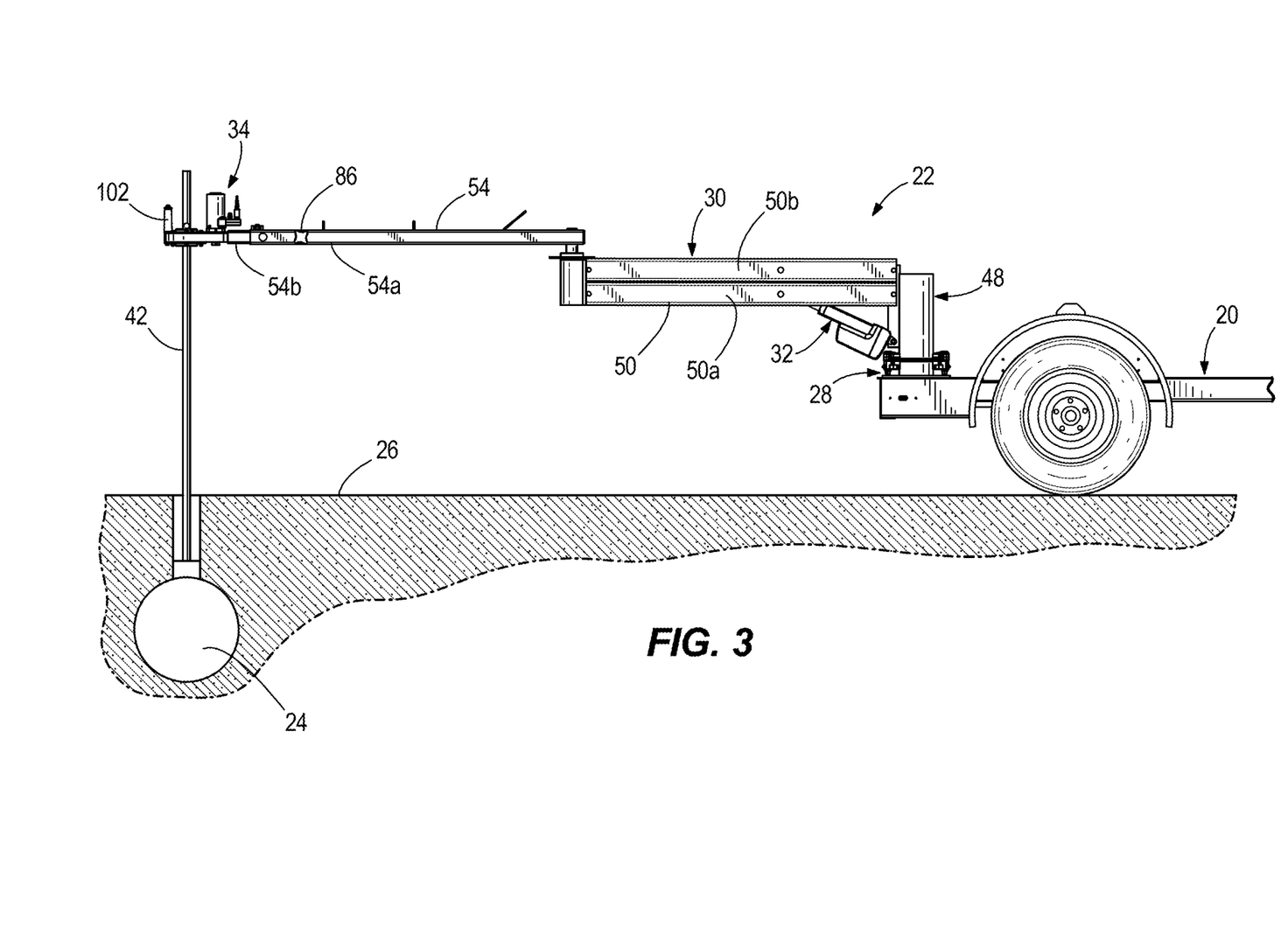
FIG. 3 is a side elevational view of the valve operating device in an operating orientation, shown mounted on a bed of a vehicle, and shown with a valve being exercised, in accordance with the present disclosure.
Figure 4:
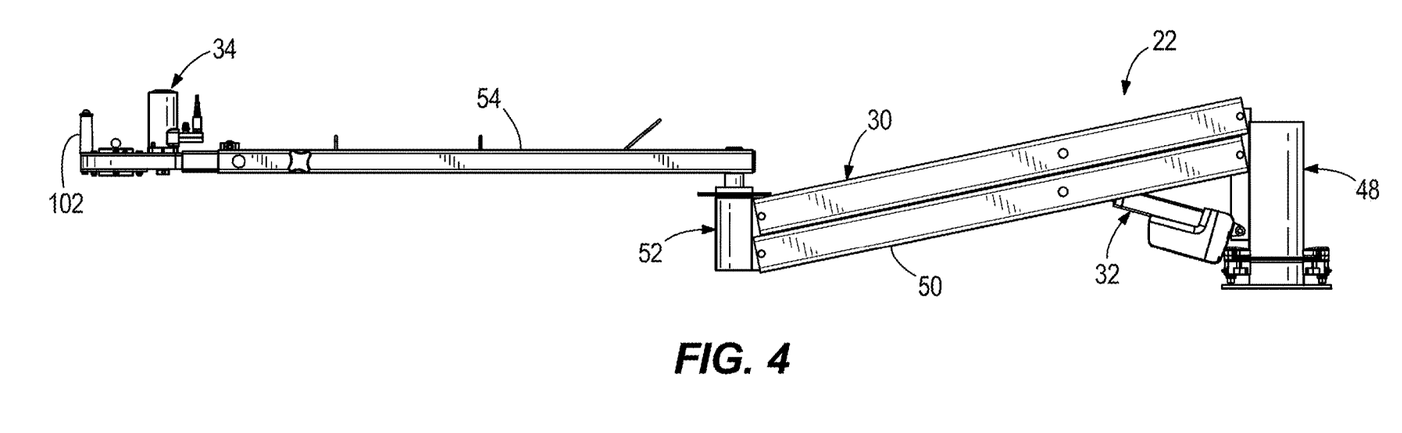
FIG. 4 is a side elevational view of the valve operating device in a lowered, extended orientation.
Figure 5:
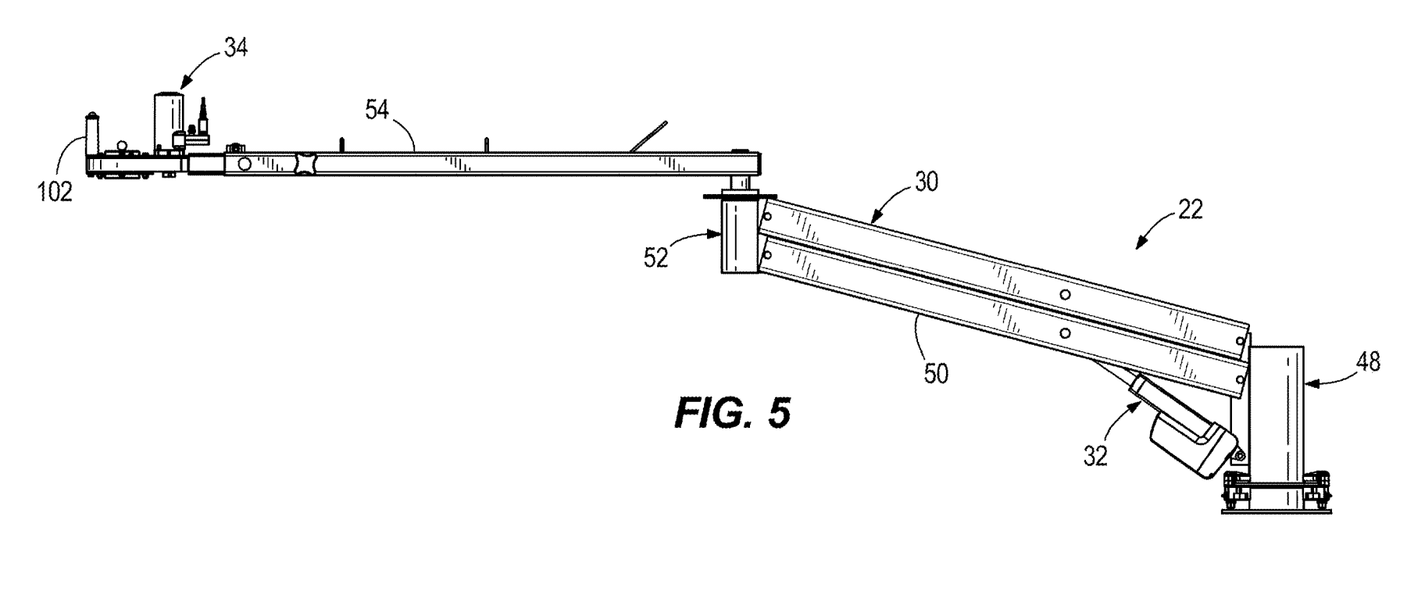
FIG. 5 is a side elevational view of the valve operating device in a raised, extended orientation.

Referring to FIGS. 1-3, one example of a vehicle 20 is shown and is fitted with one example of a valve operating device 22 which is used to exercise a valve 24, which in some examples may be an underground valve. The valve operating device 22 is attached to a stable part of the vehicle 20, such as a trailer coupled to a truck or other transportable vehicle, which remains generally parallel to the level of underlying ground 26. While the valve operating device 22 is shown and described as being mounted on the illustrated example of the vehicle 20, the valve operating device 22 can be mounted on any stable surface of any type of vehicle during operation. For example, the valve operating device 22 may be coupled to a truck bed, a front or rear bumper of a truck, or any other stable surface associated with a vehicle 20 or other portable machine.

The valve operating device 22 has a mounting portion 28 affixed to the vehicle 20 or other stable surface, an arm 30 extending from the mounting portion 28 and movable relative to the mounting portion 28, an actuator 32 for effecting a movement of the arm 30 relative to the mounting portion 28, and a valve turning machine 34 attached to the arm 30. The arm 30 is rotatable around two vertical axes 36, 38, and one horizontal axis 40 so that the valve turning machine 34 can be positioned at a desired orientation relative to the valve 24 and to the ground 26. The rotation around the vertical axes 36, 38 provides for the positioning of the valve turning machine 34 directly above the valve 24. The rotation around the horizontal axis 40 provides for the positioning of the valve turning machine 34 vertically upwardly or downwardly to accommodate uneven ground 26 so that the valve turning machine 34 can be directly positioned above the valve 24. The valve turning machine 34 is used to exercise the valve 24 by an elongated key 42, see FIGS. 3 and 8, attached to the valve turning machine 34.

Figure 6:
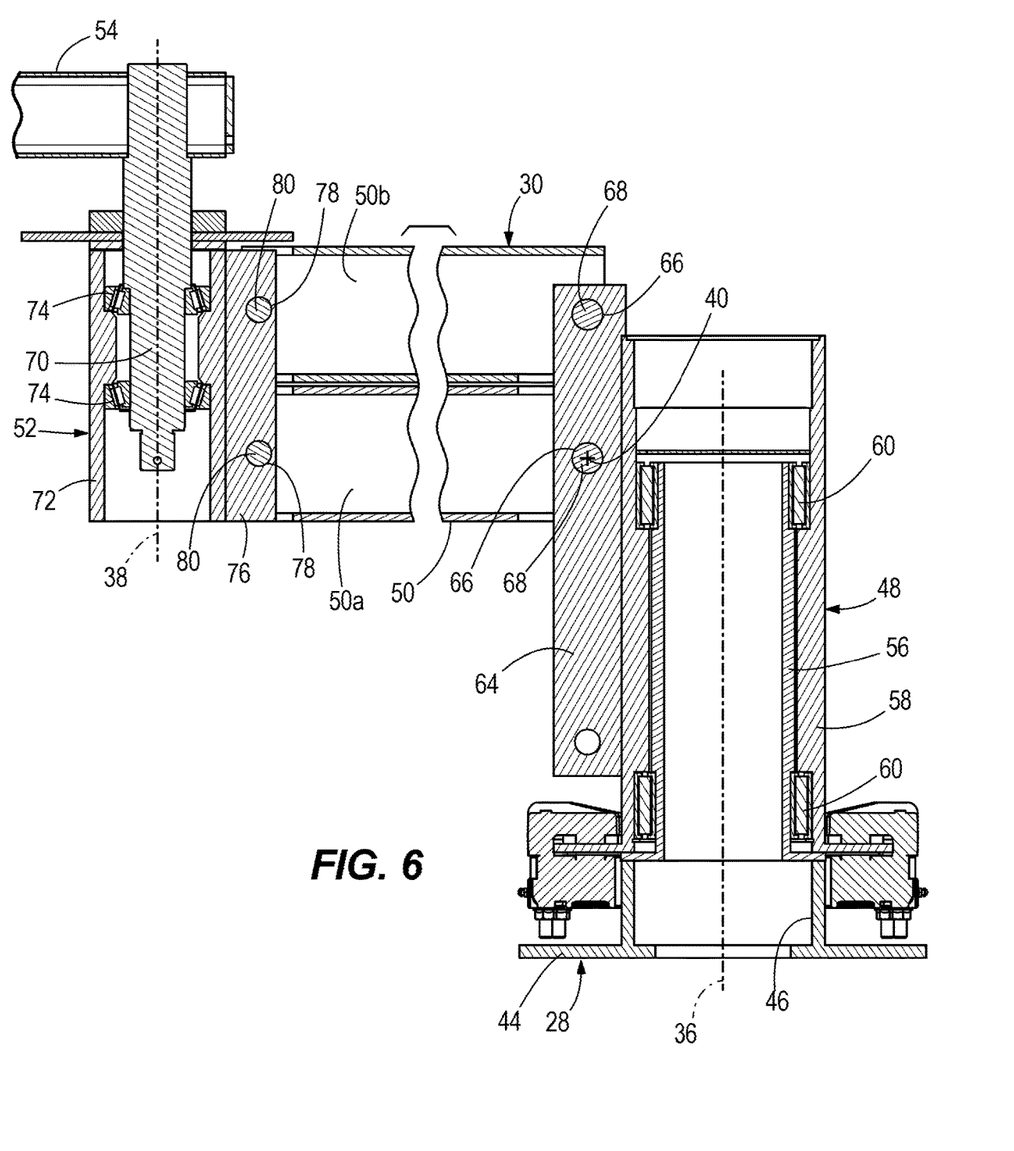
FIG. 6 is a fragmentary cross-sectional view of valve operating device showing inner parts of pivots thereof.

With continued reference to FIGS. 1 and 2 and further reference to FIG. 6, the mounting portion 28 may include a planar mounting plate 44 attached to the vehicle 20 or the other stable surface, and an upstanding mount 46 extending vertically upward from the mounting plate 44. The mounting plate 44 may have a plurality of mounting holes therein for attachment to the vehicle 20 or other stable surface by fasteners.

Referring now to FIGS. 1-5, the arm 30 includes a first pivot 48 attached to the mounting plate 44, a first elongated arm portion 50 having a first end attached to the first pivot 48, a second pivot 52 attached to a second opposite end of the first arm portion 50, and a second elongated arm portion 54 having a first end attached to the second pivot 52.

As shown in FIG. 6, the first pivot 48 includes a pedestal 56, which may be formed of a tubular member, fixedly attached to the mounting plate 44, and a mounting cup 58, which may be formed of a tubular member, surrounding the pedestal 56 and rotatably mounted on the pedestal 56 by bearings 60 positioned between the pedestal 56 and the mounting cup 58. The first pivot 48 defines the vertical axis 36 through the center of the pedestal 56. The first pivot 48 further includes a bracket 64, which may take the form of a plate, which extends outwardly from, and is rigidly affixed to, the mounting cup 58. The bracket 64 includes a plurality of apertures 66 therethrough to which the first end of the first arm portion 50 is mounted by pivot pins 68 which defines the horizontal axis 40.

As shown in FIG. 6, the second pivot 52 includes a pedestal 70, which may be formed of a tubular member, fixedly attached to the second arm portion 54, and a mounting cup 72, which may be formed of a tubular member, surrounding the pedestal 70. The pedestal 70 is rotatably mounted within the mounting cup 72 by bearings 74 positioned between the pedestal 70 and the mounting cup 72. The pedestal 70 extends outwardly from the mounting cup 72. As shown, the pedestal 70 extends upwardly from the mounting cup 72. The second pivot 52 defines the vertical axis 38 through the center of the pedestal 70. The second pivot 52 further includes a bracket 76, which may take the form of a plate, which extends outwardly from, and is rigidly affixed to, the mounting cup 72. The bracket 76 includes a plurality of apertures 78 therethrough to which a second end of the first arm portion 50 is mounted by pivot pins 80. The brackets 64, 76 are co-planar with each other. The vertical axes 36, 38 are parallel to each other. The mounting cup 72 retains the axis of rotation of the bearings 74 around the pedestal 70 parallel to the axis of rotation of the bearings 60 around the pedestal 56. Accordingly, the second arm portion 54 will rotate about the axis 38 defined by the pedestal 70 with the length thereof parallel to the vehicle 20 or other stable surface with a second end of the second arm portion 54 moving in a plane parallel to the vehicle 20 or other stable surface and parallel to the underlying ground 26.

The first arm portion 50 rotates relative to the first pivot 48, the mounting portion 28, and the vehicle 20 or other stable surface around the pivot pins 68 and thus around the horizontal axis 40. The first arm portion 50 also rotates relative to the second pivot 52 around the pivot pins 80. As such, the first arm portion 50 can pivot relative to the first and second pivots 48, 52 to raise or lower the second arm portion 54.

In the illustrated embodiment, the first arm portion 50 is formed of two elongated members 50a, 50b which are parallel to each other, and the member 50a is vertically lower than the member 50b. The elongated members 50a, 50b may be formed of tubes. Each elongated member 50a, 50b has a first end attached to the bracket 64 at pivot pin 68, and a second opposite end attached to the bracket 76 at a pivot pin 80.

Figure 7:
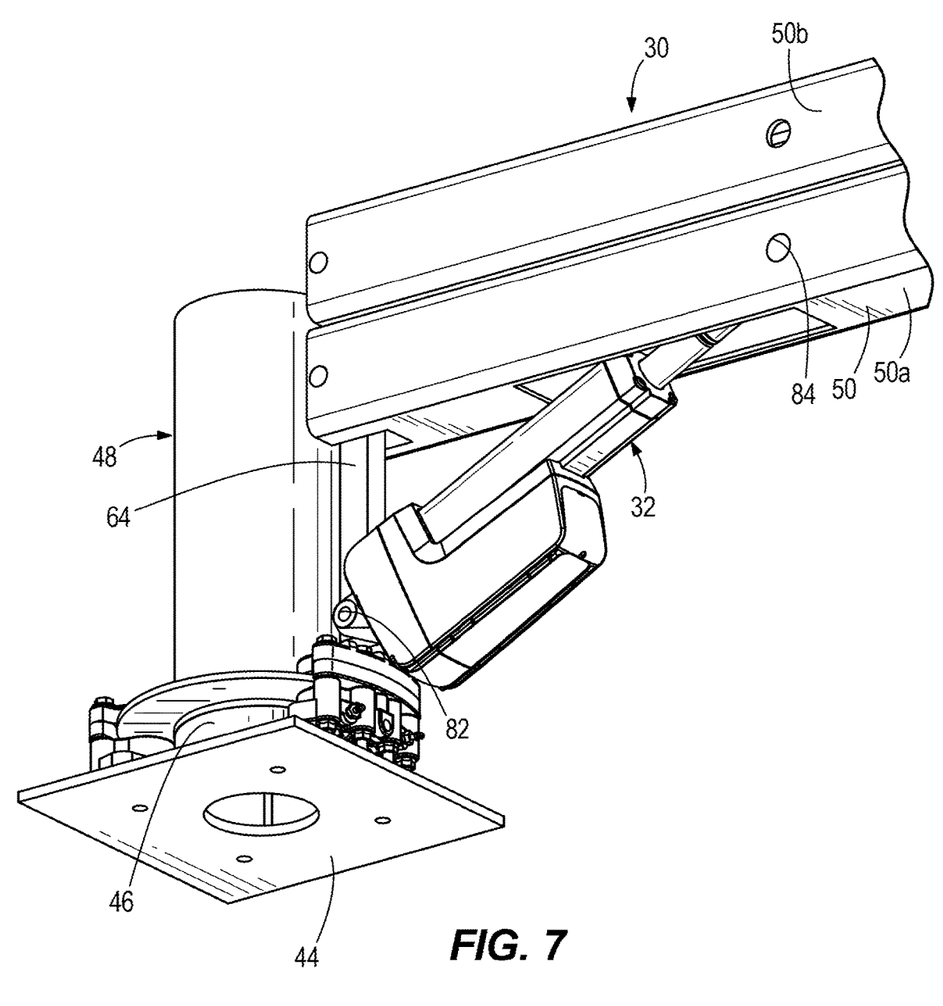
FIGS. 7 and 8 are partial perspective views of the valve operating device.

As best shown in FIG. 7, the actuator 32 is provided between the bracket 64 and the first arm portion 50 and is used to rotate the arm 30 around the horizontal axis 40. As shown, the actuator 32 is provided between the bracket 64 and the lower member 50a. A first end of the actuator 32 is pivotally attached to the bracket 64 at a pivot 82 which may be formed of a pin extending from the actuator 32 and which extends through an aperture, see FIG. 6, in the bracket 64. The pivot 82 is vertically lower than the pivot pins 68. A second end of the actuator 32 is pivotally attached to the first arm portion 50 at a pivot 84 which may be formed by a pin extending from the actuator 32 which extends through an aperture in the first arm portion 50. In an example, the second end of the actuator 32 is pivotally attached to the lower member 50a. In one example, the actuator 32 is an electric cylinder. In an example, the actuator 32 is a linear actuator. In an example, the actuator 32 is a hydraulic cylinder. It should be understood the actuator 32 may be any type of actuator configured to apply the necessary force to the arm in order to move the arm in a necessary manner to ensure proper operation of the arm, and all of such actuators and equivalents thereof are intended to be within the spirit and scope of the present disclosure.

Referring now to FIG. 6, a first end of the second arm portion 54 is fixedly attached to the pedestal 70 of the second pivot 52. As such, the second arm portion 54 rotates around the vertical axis 38 relative to the first arm portion 50 and the vehicle 20 or other stable surface. Since the first arm portion 50 is attached to the bracket 64 which is fixedly attached to the mounting cup 58, the first arm portion 50, and thus the second arm portion 54, rotate around the vertical axis 36. When only rotating the arm 30 using the first and second pivots 48, 52 around the vertical axes 36, 38, the second end of the second arm portion 54 always moves within the same plane regardless of whether the movement occurs as a result of rotation of the first pivot 48 or the second pivot 52.

In an example, the second arm portion 54 is formed of an elongated first member 54a, which forms a first section of the second arm portion 54, having an elongated second member 54b, which forms a second section of the second arm portion 54, which telescopes outwardly from the first member 54a. Each first and second member 54a, 54b may be formed of a generally hollow tube with a rectangular cross-section. In an example, the second member 54b has outer dimensions which are slightly smaller than the inner dimensions of the first member 54a such that the second member 54b seats within the first member 54a and will not rotate axially with respect to the first member 54a. A first end of the first member 54a is fixedly attached to the pedestal 70 of the second pivot 52 and rotates with the pedestal 70, and thus rotates relative to the first pivot 48, the mounting portion 28, and the vehicle 20 or other stable surface, around the vertical axis 38 of the second pivot 52. A mechanical lock 86 is provided, which, when engaged, prevents movement of the second member 54b relative to the first member 54a. In an example as shown, the lock 86 is an adjustable screw with an enlarged head in the shape of a handle is threaded into a complimentarily threaded hole (not shown) in the wall of the first member 54a and against the surface of the second member 54b. When the screw is tightened against the second member 54b, the first and second members 54a, 54b are longitudinally locked to one another; and when the screw is loosened, the second member 54b is longitudinally movable with respect to the first member 54a. It is to be understood that the first member 54a may instead seat within the second member 54b, such that the first member 54a has outer dimensions which are slightly smaller than the inner dimensions of the second member 54b such that the first member 54a will not rotate axially with respect to the second member 54b. When only rotating the arm 30 using the first and second pivots 48, 52 around the vertical axes 36, 38, the second end of the second arm portion 54 always moves within the same plane regardless of whether the movement occurs as a result of rotation of the first pivot 48 or the second pivot 52, or the longitudinal extension or retraction of the second arm portion 54 by telescopically sliding the first and second members 54a, 54b. While the second arm portion 54 is shown and described as being two telescoping members 54a, 54b, the second arm portion 54 can be formed of a single elongated member.

Figure 8:
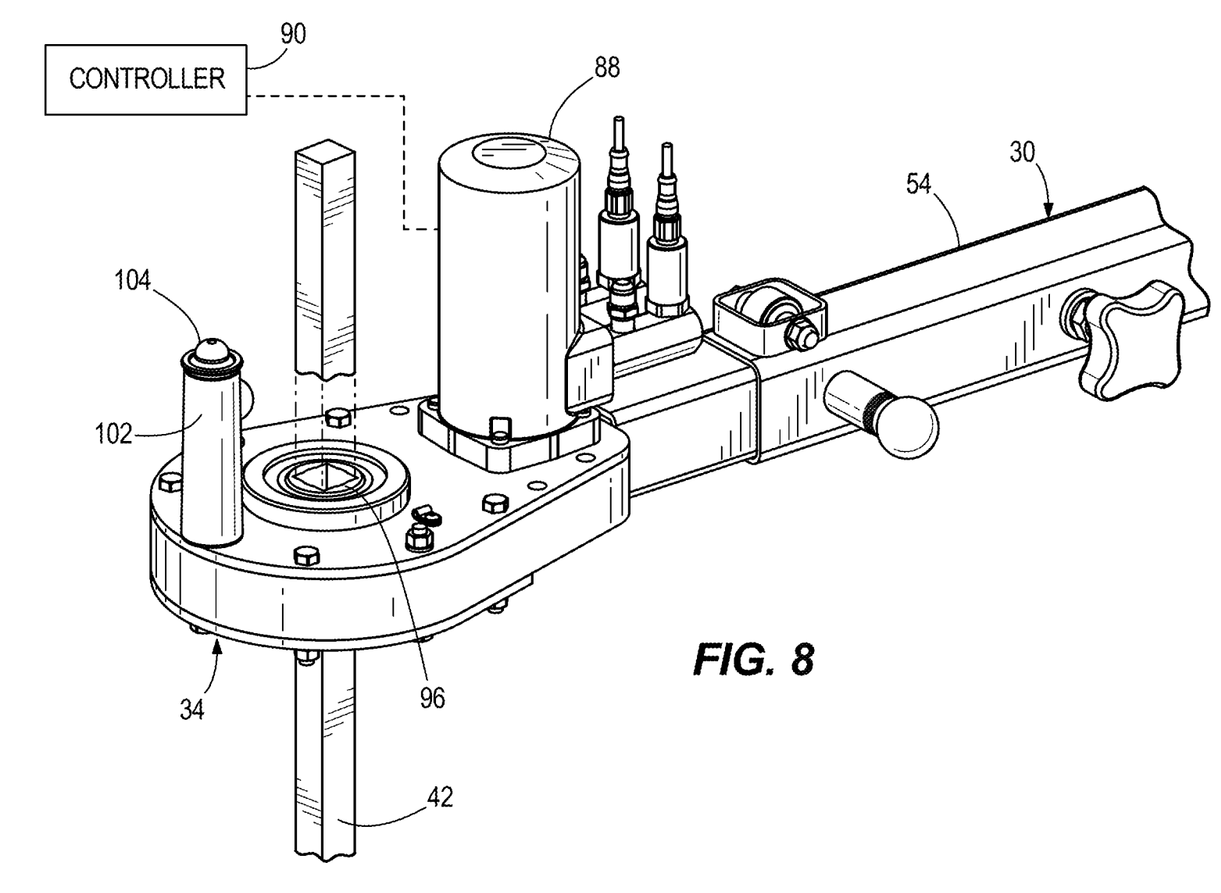

The valve turning machine 34 is rigidly attached to the second end of the second arm portion 54. As shown in FIG. 8, the valve turning machine 34 includes a hydraulic motor 88 and an electronic controller 90. The electronic controller 90 may be detachable from the valve turning machine 34, but communicates with the valve turning machine 34 either through a wire, not shown, or by wireless technology. The electronic controller 90 includes a microprocessor having a memory for storing information about the valve 24 to be controlled, such as the rotational direction for opening the valve 24, the number of turns to move the valve 24 from fully closed to fully open position, the maximum torque that can be applied to the stem of the valve 24, the current position, open or closed, of the valve 24, and the date on which the valve 24 was last exercised. Using input from an operator which may be provided by an interface 92, shown schematically in FIG. 9, and the information in the memory, the electronic controller 90 operates a sequence of valves (not shown) to direct hydraulic fluid from a pump 94, shown schematically in FIG. 9, through a plurality of hoses to operate the motor 88 in either a clockwise or counterclockwise direction. The motor 88 drives a rectangular sleeve 96 on the valve turning machine 34 into which the key 42 is inserted, the lower end of the key 42 fits over the stem of the valve 24, for rotating the valve 24. The key 42 may be polygon-shaped and may fit through a polygon-shaped opening in the sleeve 96. The valve turning machine 34 is the type known in the art and such a machine is described in further detail in U.S. Pat. No. 5,361,996, which is incorporated herein by reference.

Figure 9:
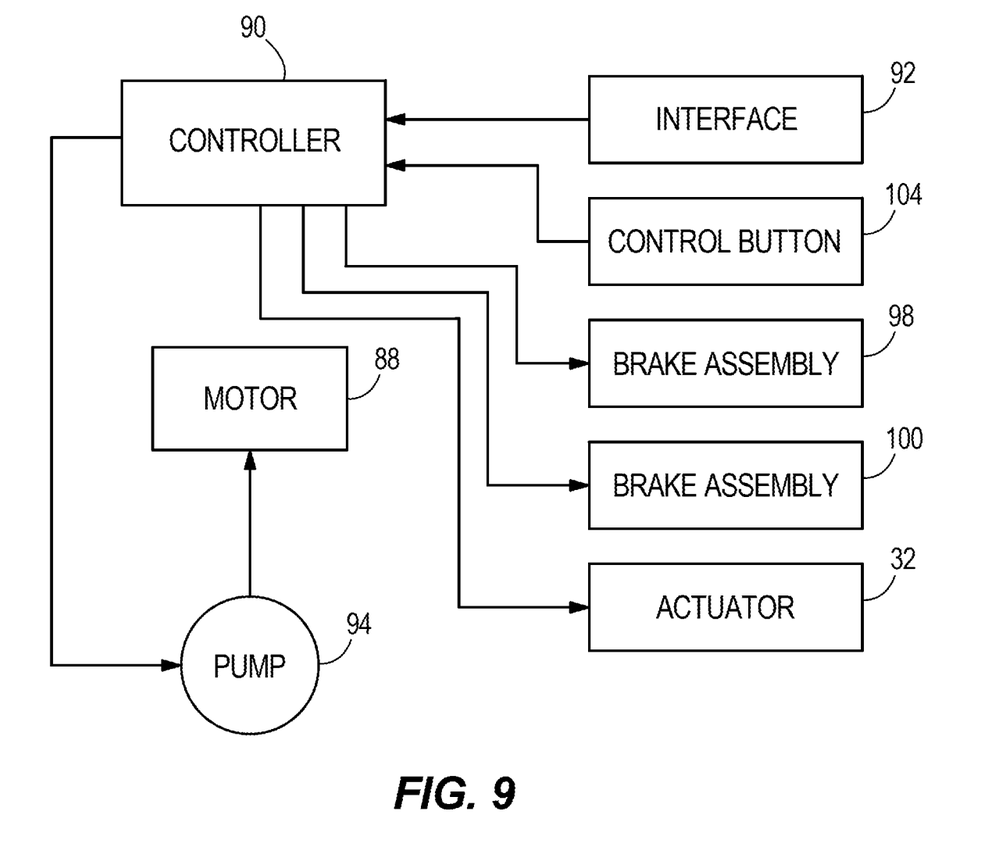
FIG. 9 is a schematic view of an electronic controller for operating the valve operating device.

A first brake assembly 98, shown schematically in FIG. 9, may be provided to lock the first pivot 48 in place once a desired orientation is achieved to exercise the valve 24, such that the first arm portion 50 does not rotate around the vertical axis 36. This prevents rotation of the first arm portion 50 relative to the mounting portion 28 and the vehicle 20 or other stable surface around the vertical axis 36. A second brake assembly 100, shown schematically in FIG. 9, may be provided to lock the second pivot 52 in place once a desired position is achieved to exercise the valve 24, such that the second arm portion 54 does not rotate around the vertical axis 38. This prevents rotation of the second arm portion 54 relative to the mounting portion 28 and the vehicle 20 or other stable surface around the vertical axis 38. Each brake assembly 98, 100 can be controlled by the electronic controller 90. The sets of bearings 60, 74 ensure that the second end of the second arm portion 54 is only movable within a plane parallel to the vehicle 20 or other stable surface and thus the underlying ground 26, and allow the arm 30 to be manipulated by an operator using only one hand when the two brake assemblies 98, 100 are disengaged.

With reference to FIG. 8, a handle 102 is positioned at the outer end of the valve turning machine 34 where it is easily grasped by an operator. A control button 104 may be provided at the distal end of the handle 102 and provides an input to the electronic controller 90. When the control button 104 is depressed, the electronic controller 90 operates to release the brake assemblies 98, 100 and to enable operation of the actuator 32 and to allow rotation around the pivots 48, 52. Conversely, when the control button 104 is not depressed, the electronic controller 90 operates to lock the brake assemblies 98, 100 which lock the positions of the first and second pivots 48, 52 in their desired orientation and to disable the actuator 32 to lock the first arm portion 50 in its desired orientation. In one example, the brake assemblies 98, 100 may be hydraulic brakes and may be hydraulically actuated. In other examples, the hydraulic brakes may be other types of brakes including, but not limited to, disc brakes, pneumatic brakes, etc., and may include the appropriate complementary components to actuate the different types of brakes. Although the control button 104 is described as being at the end of the handle 102, the control button 104 can be located at any position where the control button 104 is convenient to the operator as the arm 30 is manipulated. Additionally, in some examples, a plurality of control buttons may be included in the valve operating device 22. In such examples, a first control button may be used to operate the first brake assembly 98 and a second control button may be used to operate the second brake assembly 100.

When the valve operating device 22 is not being used and is in storage, as shown in FIGS. 1 and 2, the first arm portion 50 and the second arm portion 54 are vertically stacked above each other and are parallel to each other which causes the pivots 48, 52 to be aligned with each other. The brake assemblies 98, 100 are locked, so the first arm portion 50 cannot rotate around the first pivot 48 and the second arm portion 54 cannot rotate around the second pivot 52. In addition, the actuator 32 is locked, so the first arm portion 50 cannot rotate around the pivot 80.

An operator using the vehicle 20 fitted with the valve operating device 22 will drive the vehicle 20 to a position near the valve 24. Once the vehicle 20 is properly positioned, the operator can grasp the handle 102 with one hand, depress the control button 104 with the thumb of that hand, and using the same hand manipulate the second end of the second arm portion 54 until it is positioned immediately above the valve 24 to be exercised. During this movement, the first arm portion 50 can rotate around the vertical axis 36 defined by the first pivot 48 and therefore the ground 26, the second arm portion 54 can rotate around the vertical axis 38 defined by the second pivot 52 and therefore the ground 26, the second arm portion 54 can telescope (if a telescoping second arm portion 54 is provided) along a longitudinal direction relative to the ground 26. The operator can rotate the first arm portion 50 around the horizontal axis 40, which causes the second arm portion 54 and the valve turning machine 34 to rotate around the horizontal axis 40 and be raised vertically higher or lower than when in the storage position so that the valve turning machine 34 is properly positioned for exercising the valve 24. In some situations, as the operator is manipulating the second end of the second arm portion 54 to be positioned immediately above the valve 24, the valve 24 may interfere with the second arm portion 54 and the operator must rotate the first arm portion 50 around the horizontal axis 40 to clear the valve 24 prior to final positioning of the second arm portion 54. Continued adjustments between rotation of the first arm portion 50 and movement of the second arm portion 54 can be made in any order as the operator deems necessary to properly position the valve turning machine 34 for exercising the valve 24. Of course, the operator could first rotate the first arm portion 50 around the horizontal axis 40 prior to any movement of the second arm portion 54. Therefore, the provision of having the arm 30 rotatable around two vertical axes 36, 38 and one horizontal axis 40 provides a great amount of flexibility for the operator to position the valve turning machine 34 at the desired orientation relative to the valve 24 and to the ground 26, especially when the ground 26 is uneven.

Once the arm 30 is properly positioned above the stem of the valve 24, the operator can release his grip on the control button 104 thereby causing the braking assemblies 98, 100 to be locked in their present orientation and thereby causing the actuator 32 to be locked from further movement. With the first and second arm portions 50, 54 locked, the operator can position the key 42 in the sleeve 96 of the valve turning machine 34 with distal end thereof fitted over the stem of the valve 24. Once the key 42 is attached to the valve 24, the operator can then use the electronic controller 90 to operate the valve turning machine 34 to exercise the valve 24 without requiring the operator to touch the valve turning machine 34 while it is operating. The operator, therefore, does not have to use his body weight to retain the valve turning machine 34 against the forces generated as torque is applied to the valve as is the case with machines mounted on prior art manipulating arms.

After the valve 24 has been fully exercised, the operator can remove the key 42 from the valve stem and the sleeve 96 thereby disconnecting the valve turning machine 34 from the valve 24. The operator can then again grasp the handle 102 and depress the control button 104, thereby causing the braking assemblies 98, 100 to release and enable actuation of the actuator 32. This allows the operator to easily manipulate the arm 30 and move the arm 30 into the storage position for transportation to another site.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings.

The mounting portion 28 and the arm 30 are made with sufficient strength and rigidity to hold the valve turning machine 34 during operation. Specifically, the elongated arm portions 50, 54 are made sufficiently strong and the bearings 60, 74 of the pivots 48, 52 are sufficiently large and rigid enough to hold the valve turning machine 34 at a fixed elevation in opposition to the forces of gravity applied by virtue of the weight of the valve turning machine 34 and in opposition to the vertical forces incurred as the valve turning machine 34 applies torque to the stem of the valve 24. Accordingly, an operator will not be required to use his own body to retain the valve turning machine 34 against the forces that shake and throw the valve turning machine 34 when torque is applied to the valve 24.

It should also be understood that use of numerical terms such as, for example, "first", "second", "third", etc., should not be interpreted to imply an order or sequence of components or functions. Moreover, use of these numerical terms is not intended to pertain to only the component and/or function with which they are utilized. Rather, the use of these numerical terms is merely used to assist the reader with understanding the subject matter of the present disclosure. For example, one of the components in the specification may be referenced as a "first component", but the same component may be referenced differently in the claims (e.g., second or third component).

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Also, the following examples are provided, which are numbered for easier reference.

1. A valve operating device comprising: a first pivot; a second pivot; a first arm portion between the first and second pivots, wherein the first arm portion is configured to rotate around a first vertical axis defined by the first pivot and is configured to pivot around a horizontal axis defined by the first pivot, the first arm portion being configured to pivot relative to the second pivot; a second arm portion extending from the second pivot, wherein the second arm portion is configured to rotate around a second vertical axis defined by the second pivot; a valve operating machine attached to the second end of the second arm portion; and an actuator connected between the first pivot and the first arm portion and configured to cause the first arm portion, the second pivot, the second arm portion and the valve operating machine to pivot upward and downward relative to the first pivot around the horizontal axis.

2. The valve operating device of example 1, wherein the actuator is one of an electric cylinder, a linear actuator, and a hydraulic cylinder.

3. The valve operating device of example 1, wherein the actuator is pivotally connected to the first pivot.

4. The valve operating device of example 1, further comprising a mounting for retaining the valve operating device to a vehicle.

5. The valve operating device of example 4, wherein the first arm portion, the second pivot, the second arm portion and the valve operating machine can be pivoted around the first and second pivots to vertically align the first and second pivots into a storage orientation on the vehicle.

6. The valve operating device of example 1, wherein the first arm portion includes an upper arm member and a lower arm member.

7. The valve operating device of example 6, wherein each pivot includes a mounting cup rotatably mounted on a pedestal.

8. The valve operating device of example 7, wherein each mounting cup has a bracket extending therefrom to which the first arm portion is attached.

9. The valve operating device of example 6, further comprising a mounting for retaining the valve operating device to a vehicle.

10. The valve operating device of example 6, wherein the second arm portion includes first and second members which telescope relative to each other.

11. The valve operating device of example 10, wherein the first and second members of the second arm portion can be selectively locked into position relative to each other.

12. The valve operating device of example 1, wherein each pivot includes a mounting cup rotatably mounted on a pedestal.

13. The valve operating device of example 12, wherein each mounting cup has a bracket extending therefrom to which the first arm portion is attached.

14. The valve operating device of example 1, further comprising a first brake configured to lock the first pivot into a desired orientation, and a second brake configured to lock the second pivot into a desired orientation.

15. The valve operating device of example 14, wherein the first and second brakes are hydraulic.

16. The valve operating device of example 14, further comprising an electronic controller configured to control operation of the first and second brakes.

17. The valve operating device of example 1, further comprising a handle on the valve operating machine.

18. A valve operating device comprising: a first pivot; a mounting for retaining the first pivot to a vehicle; a second pivot; a first arm portion between the first and second pivots, wherein the first arm portion is configured to rotate around a first vertical axis defined by the first pivot and is configured to pivot around a horizontal axis defined by the first pivot, the first arm portion being configured to pivot relative to the second pivot, the first arm portion including an upper arm member and a lower arm member; a first brake configured to lock the first pivot into a desired orientation; a second arm portion extending from the second pivot, wherein the second arm portion is configured to rotate around a second vertical axis defined by the second pivot, the second arm portion including first and second members which telescope relative to each other and can be locked into position relative to each other; a valve operating machine attached to the second end of the second arm portion; a second brake configured to lock the second pivot into a desired orientation; an actuator pivotally connected between the first pivot and the first arm portion and configured to cause the first arm portion, the second pivot, the second arm portion and the valve operating machine to pivot upward and downward relative to the first pivot around the horizontal axis; and a handle on the valve operating machine.

19. The valve operating device of example 18, wherein the actuator is one of an electric cylinder, a linear actuator, and a hydraulic cylinder.

20. The valve operating device of example 18, wherein each pivot includes a mounting cup rotatably mounted on a pedestal, each mounting cup having a bracket extending therefrom to which the first arm portion is attached.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A valve operating device comprising:
a first pivot defining a first vertical axis and a horizontal axis;
a second pivot defining a second vertical axis;
a first arm portion between the first and second pivots, wherein the first arm portion is configured to rotate around the first vertical axis defined by the first pivot and is configured to pivot around the horizontal axis defined by the first pivot, the first arm portion being configured to pivot relative to the second pivot;
a second arm portion extending from the second pivot, wherein the second arm portion is configured to rotate around the second vertical axis defined by the second pivot;
a valve operating machine fixedly attached to an end of the second arm portion, the valve operating machine being operable to turn a key to exercise a valve; and
an actuator connected between the first pivot and the first arm portion and configured to cause the first arm portion, the second pivot, the second arm portion and the valve operating machine to pivot upward and downward relative to the first pivot around the horizontal axis.

2. The valve operating device of claim 1, wherein the actuator is one of an electric cylinder, a linear actuator, and a hydraulic cylinder.

3. The valve operating device of claim 1, wherein the actuator is pivotally connected to the first pivot.

4. The valve operating device of claim 1, further comprising a mounting for retaining the valve operating device to a vehicle.

5. The valve operating device of claim 4, wherein the first arm portion, the second pivot, the second arm portion and the valve operating machine can be pivoted around the first and second pivots to vertically align the first and second pivots into a storage orientation on the vehicle.

6. The valve operating device of claim 1, wherein the first arm portion includes an upper arm member and a lower arm member.

7. The valve operating device of claim 6, wherein each pivot includes a mounting cup rotatably mounted on a pedestal.

8. The valve operating device of claim 7, wherein each mounting cup has a bracket extending therefrom to which the first arm portion is attached.

9. The valve operating device of claim 6, further comprising a mounting for retaining the valve operating device to a vehicle.

10. The valve operating device of claim 6, wherein the second arm portion includes first and second members which telescope relative to each other.

11. The valve operating device of claim 10, wherein the first and second members of the second arm portion can be selectively locked into position relative to each other.

12. The valve operating device of claim 1, wherein each pivot includes a mounting cup rotatably mounted on a pedestal.

13. The valve operating device of claim 12, wherein each mounting cup has a bracket extending therefrom to which the first arm portion is attached.

14. The valve operating device of claim 1, further comprising a first brake configured to lock the first pivot into a desired orientation, and a second brake configured to lock the second pivot into a desired orientation.

15. The valve operating device of claim 14, wherein the first and second brakes are hydraulic.

16. The valve operating device of claim 14, further comprising an electronic controller configured to control operation of the first and second brakes.

17. The valve operating device of claim 1, further comprising a handle on the valve operating machine.

18. A valve operating device comprising:
a first pivot defining a first vertical axis and a horizontal axis;
a mounting for retaining the first pivot to a vehicle;
a second pivot defining a second vertical axis;
a first arm portion between the first and second pivots, wherein the first arm portion is configured to rotate around the first vertical axis defined by the first pivot and is configured to pivot around the horizontal axis defined by the first pivot, the first arm portion being configured to pivot relative to the second pivot, the first arm portion including an upper arm member and a lower arm member;
a first brake configured to lock the first pivot into a desired orientation;
a second arm portion extending from the second pivot, wherein the second arm portion is configured to rotate around the second vertical axis defined by the second pivot, the second arm portion including first and second members which telescope relative to each other and can be locked into position relative to each other;
a valve operating machine fixedly attached to an end of the second arm portion, the valve operating machine being operable to turn a key to exercise a valve;
a second brake configured to lock the second pivot into a desired orientation;
an actuator pivotally connected between the first pivot and the first arm portion and configured to cause the first arm portion, the second pivot, the second arm portion and the valve operating machine to pivot upward and downward relative to the first pivot around the horizontal axis; and
a handle on the valve operating machine.

19. The valve operating device of claim 18, wherein the actuator is one of an electric cylinder, a linear actuator, and a hydraulic cylinder.

20. The valve operating device of claim 18, wherein each pivot includes a mounting cup rotatably mounted on a pedestal, each mounting cup having a bracket extending therefrom to which the first arm portion is attached.

* * * * *